United States Patent [19]

Click

[11] Patent Number: 4,702,329
[45] Date of Patent: Oct. 27, 1987

[54] LOAD CELL

[76] Inventor: Billy J. Click, 2619 Tradewind Dr., Lake Havasu City, Ariz. 86403

[21] Appl. No.: 835,934

[22] Filed: Mar. 4, 1986

[51] Int. Cl.$^4$ .......................... G01G 3/14; G01L 1/22
[52] U.S. Cl. .................................. 177/211; 73/862.65
[58] Field of Search ...................... 177/211; 73/862.65

[56]  References Cited
U.S. PATENT DOCUMENTS

| | | | |
|---|---|---|---|
| 3,376,537 | 4/1968 | Pugnaire | 177/211 X |
| 3,680,372 | 8/1972 | Ormond | 73/862.65 |
| 4,459,863 | 7/1984 | Nordstrom | 177/211 X |
| 4,546,838 | 10/1985 | Ormond | 177/211 |
| 4,589,291 | 5/1986 | Sander | 73/862.65 |

Primary Examiner—George H. Miller, Jr.

[57] ABSTRACT

A load cell including a unitary measuring body having circular end portions and an intermediate portion which defines a central axis corresponding to the direction of an applied load, the intermediate portion having a substantially rectangular cross-sectional shape to provide a pair of oppositely disposed side faces, each of the side faces having a recess with a central web therebetween and a plurality of bores extending transversely through the central web together with a plurality of strain gauges on opposite sides of the central web within the recesses responsive to the shear strain induced in the measuring body by an applied load.

8 Claims, 3 Drawing Figures

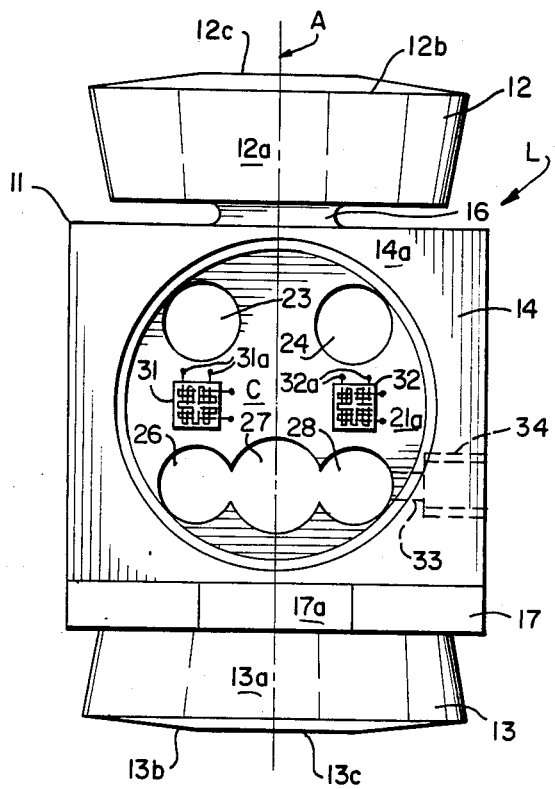
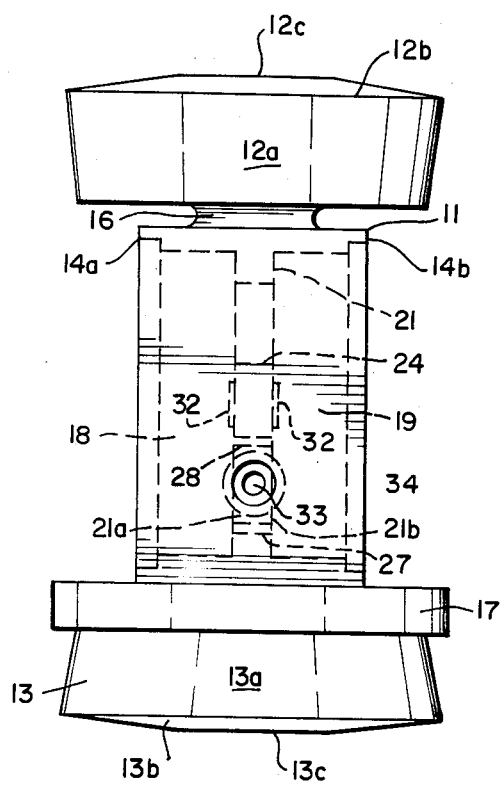
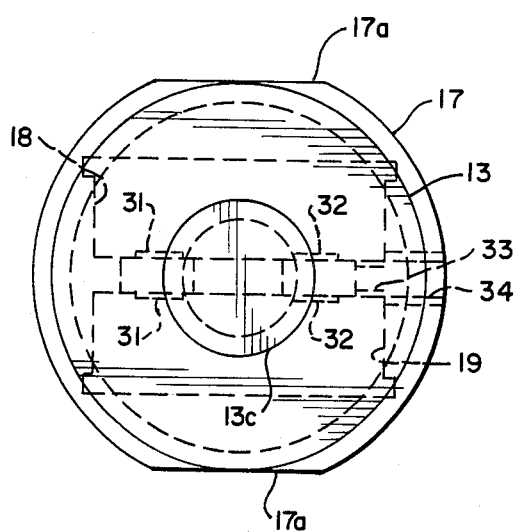

LOAD CELL

BACKGROUND OF THE INVENTION

Transducers of the type referred to as "Load Cells" are widely used in many fields for measuring an applied force on the cell. Such load cells generally include a body of resilient material into which a shear-type strain is induced by the load and with the use of electrical strain gauges mounted on the body, measurements of the distortion of one body as detected by the strain gauges are made from which the magnitude of the applied force may be determined. As an example of the use of such load cells, it is common to mount load cells on a platform structure to thereby form a platform scale which use the load cells for measuring the force or weight on the scale.

While such present day load cells generally perform satisfactory, there are limitation in these devices which have not been overcome. Many present day load cells are configured by machining or the like to provide a high flexibility for increasing sensitivity, to improve linearity and to eliminate hysteresis and creep. Such machining operations are not only expensive adding to the load cell cost but the load becomes more fragile reducing durability and therefore becoming more prone to abuse and early breakdown. Furthermore, in spite of such intricate machining, maximum sensitivity has not been obtained and linearity suffers with measurements falling outside the tolerance ranges.

OBJECTS AND SUMMARY OF THE INVENTION

Accordingly, a primary object of this invention is to provide a new and novel load cell which has a high degree of sensitivity and which is capable of producing highly accurate measurements of shear-type strain throughout a wide range.

Another object of this invention is to provide a new and novel load cell which may be easily installed, which is simple and inexpensive in construction and which is capable of prolonged use without breakdown.

A further object of this invention is to provide a new and novel load cell which may be securely maintained in the installed position without slipping.

Still another object of this invention is to provide a new and novel load cell wherein the stress produced by an applied load is concentrated in a narrow area of the cell.

A still further object of this invention is to provide a new and novel load cell which may be used in the measurement of both tension or compression forces and which permits the use of conventional strain gauges and associated monitoring equipment.

The objects stated above and other related objects are accomplished by the provision of a unitary body of resilient material such as stainless steel having a longitudinally extending central axis corresponding to the direction of an applied load. The body includes an end portion of of circular cross-sectional shape and having flat end faces at opposite ends of an intermediate portion having a rectangular cross-sectional shape, each of the side faces of which are provided with a circular, inwardly extending recess between which a central web having side walls is disposed. A plurality of transversely extending bores are provided in the central web which define a central area on each of which are mounted a pair of strain gauges for sensing the strain induced in the central web during the application of a load along the longitudinal axis of the body.

Other objects and advantages of the invention will become apparent from the following specification when viewed in the light of the attached drawing.

BRIEF DESCRIPTION OF THE DRAWING

FIG. 1 is a front elevation view of the load cell of the invention;

FIG. 2 is a side elevation view of the load cell of the invention; and

FIG. 3 is a bottom view of the load cell of the invention.

DESCRIPTION OF THE PREFERRED EMBODIMENT

Referring now to the drawing and to FIG. 1 in particular, there is shown a load cell constructed in accordance with the invention and designated generally by the letter L. The load cell L comprises a unitary body 11 of resilient material such as stainless steel or the like and includes a pair of end portions 12, 13 preferably of circular cross-sectional shape and an intermediate portion 14 of substantially rectangular cross-sectional shape.

Each of the end portions 12, 13 preferably includes a side wall 12a, 13a respectively which is slightly flared outwardly and terminates in a frusto-conical end wall 12b, 13b having a flat end face 12c, 13c respectively for centering purposes during operation. As is well known, the body 11 is configured to provide a longitudinally extending central axis designated generally by the letter A which corresponds to the direction in which a load is applied to the body. In the preferred embodiment, the end portion 12 is connected integrally to the intermediate portion 14 by a necked-down portion. The end portion 13 is connected integrally to the intermediate portion 14 by a plate member 17 preferably provided with oppositely disposed peripheral flats 17a.

The intermediate portion 14 is provided with a pair of side faces 14a, 14b each of which is provided with an inwardly directed, circular recess 18, 19 respectively as shown best in FIG. 2. The recesses 18, 19 extend inwardly to a depth so as to form a longitudinally extending central web 21 having oppositely disposed side walls 21a, 21b which are associated with and form the bottom surfaces of the recesses 18, 19 respectively.

A plurality of transversely extending bores are proin the central web 21 which define a central area C on each of the side walls 21a, 21b of the central web 21. More specifically, in the illustrated embodiment, the plurality of bores include an upper set of bores adjacent one end portion 12 which are preferably two bores 23, 24 arranged in spaced-apart relationship as shown best in FIG. 1.

The plurality of spaced-apart bores also include a lower set of bores in the central web 21 adjacent the the other end portion 13. The lower set of bores are preferably three bores 26, 27, 28 which are arranged in overlapping relationship as shown in FIG. 1 so as to form a passage therebetween. Preferably, bore 27 has a diameter somewhat larger than that of the adjoining bores 26, 28.

Means are mounted on each of the central web side walls 21a, 21b within the central area C for sensing the strain induced in the central web during the application of a load force along the longitudinal axis A of the body 11. More specifically, as shown best in FIG. 1, a pair of strain gauges 31, 32 are suitably mounted by bonding or the like in spaced-apart relationship on the central area C of each of the side walls 21a, 21b of the central web 21.

The stain gauges 31, 32 may be of conventional construction such as the strain gauges resistors disclosed in U.S. Pat. No. 3,969,935—Shoberg and are connected to a suitable stress monitoring device [not shown] by means such as conductors 31a, 32a. In the preferred embodiment, the intermediate portion 14 is provided with a laterally extending bore 33 having an enlarged tapped portion 34 opening to the exterior of the intermediate portion 14. The bore 33 extends radially through the central web 21 of the lower set of bores thereby providing access for the conductors connected between the monitoring device and the strain gauges 31, 32.

What is claimed is:

1. A load cell for measuring axially applied loads comprising, in combination, a unitary body of resilient material having a longitudinally extending central axis corresponding to the direction of an applied load, said body including an end portion at opposite ends and an intermediate portion between said end portions, said intermediate portion having a substantially rectangular, cross-sectional shape to provide a pair of oppositely disposed side faces, each of said side faces having an inwardly extending recess forming a longitudinally extending central web therebetween having oppositely disposed side walls associated with a respective one of said recesses, said central web having a plurality of bores extending transversely therethrough and defining a central area on each of said side walls and means mounted on each of said side walls within said central area for sensing the strain induced in said central web during the application of a load along said longitudinal axis of said load cell, wherein said recesses are of circular cross-sectional shape and wherein said plurality of bores include an upper set of bores in said central web adjacent one of said end portions and a lower set of bores in said central web adjacent the other of said end portions, and wherein said upper set of bores in said central web include a pair of spaced-apart bores and wherein said lower set of bores in said central web include three of said bores.

2. A load cell in accordance with claim 1 wherein said three bores are disposed in laterally overlapping relationship to provide a passage therebetween.

3. A load cell in accordance with claim 2 wherein said intermediate portion is provided with a laterally extending bore to provide a passage from the exterior of said intermediate portion with the adjacent one of said three bores through said central web.

4. A load cell in accordance with claim 3 wherein said strain sensing means comprises strain gauge means.

5. A load cell in accordance with claim 4 wherein said strain gauge means comprises a pair of spaced-apart strain gauges on the central area of each of said central web side walls between said upper and said lower sets of bores.

6. A load cell in accordance with claim 5 wherein each of said end portions are of circular cross-sectional shape.

7. A load cell in accordance with claim 6 including a necked-down portion on said body for connecting said one end portion to said intermediate portion and a plate member for connecting said intermediate portion to said other end portion.

8. A load cell in accordance with claim 7 wherein each of said end portions includes an end face opposite said intermediate portion having a substantially flat central area.

* * * * *